R. A. BAGBY.
METHOD AND MEANS FOR BRANDING.
APPLICATION FILED SEPT. 12, 1916.
1,257,065.
Patented Feb. 19, 1918.
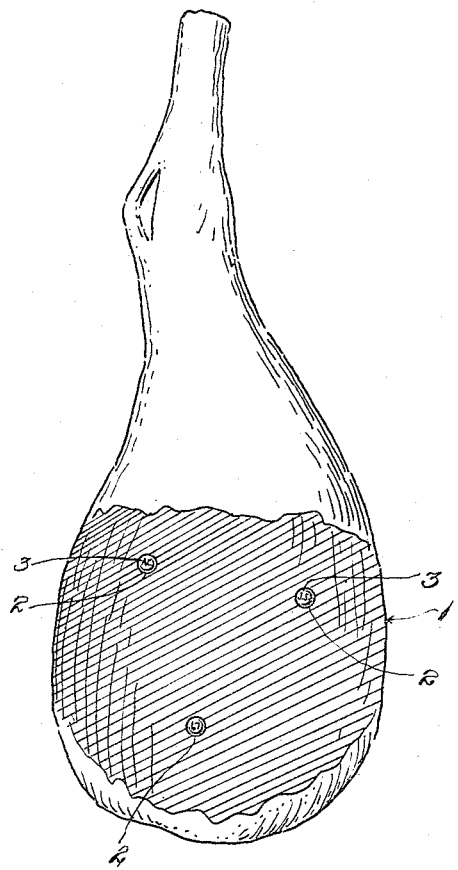
Witnesses
Inventor
R. A. Bagby
By
Attorneys

UNITED STATES PATENT OFFICE.

RALPH A. BAGBY, OF MENTOR, SOUTH DAKOTA.

METHOD AND MEANS FOR BRANDING.

1,257,065.              Specification of Letters Patent.     Patented Feb. 19, 1918.

Application filed September 12, 1916. Serial No. 119,722.

*To all whom it may concern:*

Be it known that I, RALPH A. BAGBY, a citizen of the United States, residing at Mentor, in the county of Hughes, State of South Dakota, have invented certain new and useful Improvements in Methods and Means for Branding; and I do hereby declare the following to be a full, clear, and exact description of the invention, such as will enable others skilled in the art to which it appertains to make and use the same.

This invention relates to a means and method for identifying cattle.

The invention has for its object to provide a means for identifying stolen cattle, especially after the steers or other animals have been turned into meat. In localities where cattle stealing is prevalent it often happens that the thieves slaughter the stolen animals and cut them into marketable meat, such as quarters, sides and other meats. It is obviously a difficult and practically impossible matter to identify stolen cattle in this condition since the hides and therefore the brands and other identifying marks are removed. The invention therefore contemplates the provision of an identifying mark which is embedded in the flesh of the cattle when the animals are on the hoof, the identifying mark being of such a nature as not to harm or inconvenience the animal, but being readily removable when the animals have been slaughtered. Thus, in carrying out the invention, I provide metal balls of suitable size, and of such material as will not poison or otherwise injure the cattle or meat, and have inscribed thereon the brands of the owner, and when the cattle have reached a branding age, the balls may be injected into the flesh of the animal and allowed to remain embedded therein. Obviously, the balls will be made of some material which will not corrode or be otherwise absorbed so as to obliterate the brands, silver being a suitable metal from which the balls may be molded. It is of sufficient hardness to receive and retain an inscription and does not corrode or dissolve under the action of the body juices of the animal.

With the above object in view, my invention is hereinafter described, reference being had to the accompanying drawing in which the figure represents a sectional view of a quarter of beef branded according to my new method.

Referring more particularly to the drawing 1 represents a quarter of beef, or any other meat producing animal, in which have been embedded the bodies 2 of metal or any other suitable non-corrosive and indissoluble material upon which has been inscribed a suitable brand 3 which may be the usual ranch brand or any other private mark of identification, the brand being inscribed, engraved or stamped upon the body. The bodies which will probably be spherical in form are inserted beneath the skin of the animal or in the flesh in any suitable manner, which is least harmful and painful to the latter. One method of inserting the balls or markers is to fire them into the fleshy parts of the animal from a suitably powered air gun, this method being a less painful operation than the usual branding by burning. Where the markers are formed of silver or other suitable non-corrosive metal, the slight wounds caused by the injection of the marker readily heal and obviously retain and conceal the brand. When the cattle are slaughtered and cut up for the market, the brands are obviously retained in the meat, and provide a ready means of identification. The markers can be readily found below the surface of the skin, especially if the meat is subjected to an X-ray apparatus. Thus, if it is suspected that the cattle from which the meat was cut, were stolen, an investigation may be readily instituted and the ownership of the meat established without question.

What I claim is:—

1. A method of marking cattle consisting of injecting markers into the flesh of the live cattle.

2. A method of marking cattle consisting in inserting non-corrosive and indissoluble markers in the flesh of the animals.

3. An identifying marker for cattle, and other animals, comprising a non-corrosive and indissoluble inscribed body adapted to be inserted into the flesh of the animals.

In testimony whereof, I affix my signature, in the presence of two witnesses.

RALPH A. BAGBY.

Witnesses:
F. J. EAGER,
J. KENNEY.

Copies of this patent may be obtained for five cents each, by addressing the "Commissioner of Patents, Washington, D. C."